United States Patent [19]
Yeo

[11] Patent Number: 6,125,455
[45] Date of Patent: Sep. 26, 2000

[54] POWER CONTROL DEVICE AND METHOD FOR USB

[75] Inventor: Joung-Hyun Yeo, Kyungki-do, Rep. of Korea

[73] Assignee: SamSung Electronics Co., Ltd., Kyungki-do, Rep. of Korea

[21] Appl. No.: 09/038,961

[22] Filed: Mar. 12, 1998

[30] Foreign Application Priority Data

Mar. 12, 1997 [KR] Rep. of Korea ...................... 97-08312

[51] Int. Cl.[7] .................................................. G06F 11/00
[52] U.S. Cl. ............................ 714/14; 710/126; 713/300
[58] Field of Search .............................. 395/750; 714/14; 364/707; 710/126, 1, 129; 713/300, 320, 330

[56] References Cited

U.S. PATENT DOCUMENTS

| | | |
|---|---|---|
| 5,163,124 | 11/1992 | Yabe et al. . |
| 5,404,542 | 4/1995 | Cheung . |
| 5,414,862 | 5/1995 | Suzuki et al. ............................ 713/300 |
| 5,486,726 | 1/1996 | Kim et al. ............................... 307/120 |
| 5,499,370 | 3/1996 | Hosaka et al. .......................... 709/102 |
| 5,550,985 | 8/1996 | Miller et al. . |
| 5,552,953 | 9/1996 | Meyerdirks et al. ...................... 361/93 |
| 5,559,376 | 9/1996 | Tachikawa . |
| 5,596,757 | 1/1997 | Smith . |
| 5,621,901 | 4/1997 | Morriss et al. . |
| 5,623,610 | 4/1997 | Knoll et al. . |
| 5,657,257 | 8/1997 | Lee .......................................... 364/707 |
| 5,664,089 | 9/1997 | Byers et al. . |
| 5,675,812 | 10/1997 | Nagashige et al. ...................... 395/750 |
| 5,675,813 | 10/1997 | Holmdahl ................................. 395/750 |
| 5,675,816 | 10/1997 | Hiyoshi et al. .......................... 713/324 |
| 5,808,881 | 9/1998 | Lee ............................................. 363/37 |
| 5,915,122 | 6/1999 | Fujitsu ..................................... 713/330 |

*Primary Examiner*—Robert W. Beausoliel, Jr.
*Assistant Examiner*—Pierre E. Elisca
*Attorney, Agent, or Firm*—Robert E. Bushnell, Esq.

[57] ABSTRACT

A universal serial bus (USB) power control device includes a universal serial bus control circuit for controlling mutual information transmitted between a computer and its peripheral devices, using data and clocking signals transmitted from a display, a DC—DC converter for processing a power supplied from the display in order to provide an operational power to the universal serial bus control circuit and the peripheral devices, and a universal serial bus power control circuit for detecting a power supplied to the DC—DC converter from the display. If the power supplied from the monitor to the universal serial bus control circuit is abnormal, the abnormal power supplied from the monitor is replaced by normal power supplied from the computer and a message is displayed on the monitor so that a user can recognize that a power supply supplying power to the universal serial bus has failed.

20 Claims, 5 Drawing Sheets

POWER CONTROL DEVICE AND METHOD FOR USB

CLAIM OF PRIORITY

This application makes reference to, incorporates the same herein, and claims all benefits accruing under 35 U.S.C §119 from an application for *Power Control Device And Method For USB* earlier filed in the Korean Industrial Property Office on the 12th day of March 1997, and there duly assigned Serial No. 97-8312, a copy of which is annexed hereto.

BACKGROUND OF THE INVENTION

1. Technical Field

The present invention relates to a power control device and method for a universal serial bus (USB) in a computer system, and more particularly to a power control device and method for controlling power supplied to a universal serial bus which is connected to a display and a computer system. More specifically, the present invention relates to a power control device and method for controlling the source of power supplied to a universal serial bus where, under normal operating conditions, power is supplied from a display device to a universal serial bus, and, when there is a failure or abnormality in the power supplied from the display device to the universal serial bus, power is supplied from a computer to the universal serial bus.

2. Related Art

A typical personal computer has peripheral devices connected, such as a monitor and keyboard. A user might want to use additional peripheral devices, such as a mouse, printer, light pen, or plotter. When a user tries to use multiple peripheral devices with a computer, it can be difficult to connect them since each peripheral typically has a unique type of connector. The user must carefully match the plug from each peripheral with a corresponding connector on the computer due to all the different connector types. Also, it can be difficult to configure the computer to communicate with all the peripheral devices due to the fact that some peripheral devices require unique types of hardware and software. The task of adding peripheral devices to a computer can be especially arduous for computers that do not support plug-and-play.

To solve the above described problems, a universal serial bus (USB) system has been developed. The universal serial bus is a basic system for connecting peripheral devices to a computer. Peripheral devices connected to a universal serial bus system are also referred to as universal serial bus peripheral devices.

A keyboard or monitor can be directly connected to a computer or a universal serial bus within the computer. Other peripheral devices can be easily connected to the computer with the use of an expanded hub built into the keyboard or monitor, or even via an independent universal serial bus. The expanded hub offers additional connection sockets, and can be connected in a hierarchical tree form. Peripheral devices may be located close to each other or can be located several meters from each other, with the use of a universal serial bus hub.

A universal serial bus is able to connect a total of 127 devices to one computer. The operating voltage transmitted through the universal serial bus is limited to 5 volts. Thus, peripherals connected on a universal serial bus are limited in the amount of power they can consume. A rapid data transmission rate of 12 megabits per second on the universal serial bus is one of the advantageous features of the universal serial bus.

The major advantages of the universal serial bus include the simplicity and convenience of attaching and detaching peripheral devices to the computer. The universal serial bus detects whether a device is added or removed when related information is offered from a computer. This operation is available while the power is ON, unlike existing built-in slots, eliminating the system reboot.

Some examples of universal serial bus systems are disclosed in U.S. Pat. No. 5,621,901 for *Method and Apparatus for Serial Bus Elements of an Hierarchical Serial Bus Assembly to Electrically Represent Data and Control States to Each Other* issued to Morriss et al., U.S. Pat. No. 5,623,610 for *System for Assigning Geographical Addresses in a Hierarchical Serial Bus byEnabling Upstream Port and Selectively Enabling Disabled Ports at Power On/Reset* issued to Knoll et al., and U.S. Pat. No. 5,675,813 for *System and Method for Power Control in a Universal Serial Bus* issued to Holmdahl.

Some examples of power control devices and methods are disclosed in U.S. Pat. No. 5,559,376 for *Power Supply Control System Comprising a Plurality of Power Supply Units* issued to Tachikawa, U.S. Pat. No. 5,486,726 for *Power Supply Control System of Peripheral Equipment of Computer* issued to Kim et al, U.S. Pat. No. 5,404,542 for *Power Line Switching Circuit with Monitor* issued to Cheung, U.S. Pat. No. 5,163,124 for *Method and Apparatus for Controlling Power to Device in a Computer System* issued to Yabe et al., U.S. Pat. No. 5,596,757 for *System and Method for Selectively Providing Termination Power to a SCSI Bus Terminator from a Host Device* issued to Smith, U.S. Pat. No. 5,550,985 for *Special Purpose Computer for Demonstrating Peripheral Devices such as Printers in Which Power is Withdrawn from the Port Connection of the Peripheral Device* issued to Miller et al., and U.S. Pat. No. 5,664,089 for *Multiple Power Domain Power Loss Detection and Interface Disable* issued to Byers et al.

Although presently there do exist systems which partially control the power supplied to a universal serial bus, I have discovered that it would be desirable to further enhance the power control of a universal serial bus to enable it to have a secondary source of power in the event that a primary source of power fails.

SUMMARY OF THE INVENTION

Accordingly, it is therefore an object of the present invention to provide a universal serial bus power control device and method for a computer system, which, when the power is not supplied to the universal serial bus due to a monitor's power failure, detects this and converts the power offered from the computer into the power supply of the universal serial bus.

It is another object of the present invention to provide a control device and method for displaying a message of power supply failure through a display when there is a trouble in power supply from the monitor.

To accomplish the objects of the present invention, there is provided a universal serial bus (USB) power control device including a universal serial bus control circuit for controlling mutual information transmitted between a computer and its peripheral devices, using data and clocking signals transmitted from a display, a DC—DC converter for processing a power supplied from the display in order to provide an operation power to the universal serial bus control circuit and the peripheral devices, and a universal serial bus power control circuit for detecting a power supplied to the DC—DC converter from the display. If there is a problem with the power supplied from the display to the universal serial bus circuit, the power supplied from the display is replaced by power supplied from the computer.

For another aspect of the present invention, there is provided a method of controlling a power in a universal serial bus control device including confirming whether a power offered from the display is normal or not, changing a power supply source, if a stable power is not supplied, in order to receive an operation power from a computer main body; transmitting to the computer that an output voltage from the display to the universal serial bus is not normal, and indicating a power supply failure message on the display.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
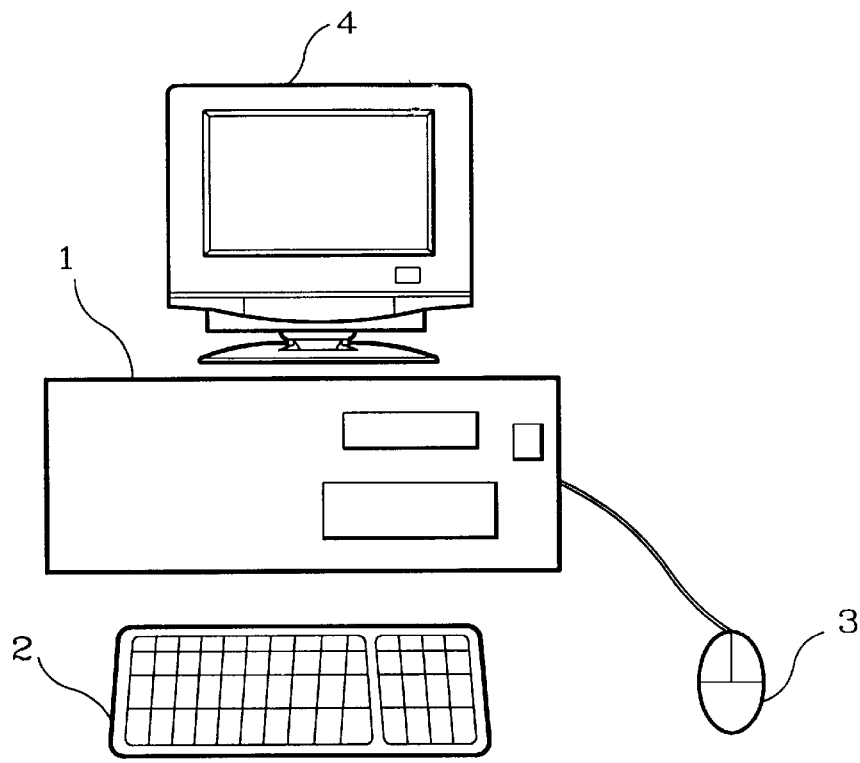
FIG. 1 is a block diagram illustrating a conventional computer system.

Refer now to the drawings and particularly to FIG. 1, which is a block diagram illustrating a conventional computer system. For input means for inputting information into computer main body 1, there are included a keyboard 2 with multiple keys, and a mouse 3 useful for graphics. As output means, a monitor 4 is used to display information transmitted from the computer main body 1 on a screen.

Figure 2:
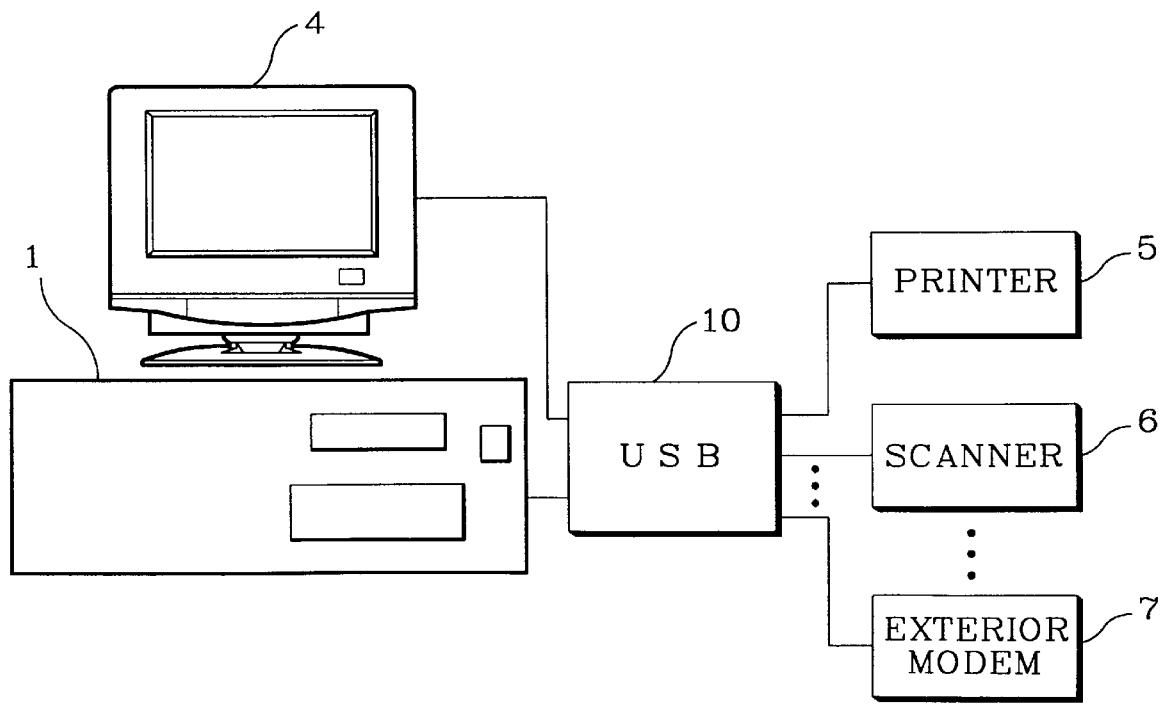
FIG. 2 is a block diagram illustrating a conventional computer system utilizing a conventional universal serial bus.

Refer now to FIG. 2, which is a block diagram illustrating a conventional computer system utilizing a conventional universal serial bus. Including universal serial bus 10, there are provided computer main body 1, monitor 4, and peripheral devices such as printer 5, scanner 6 and external modem 7.

Figure 3:
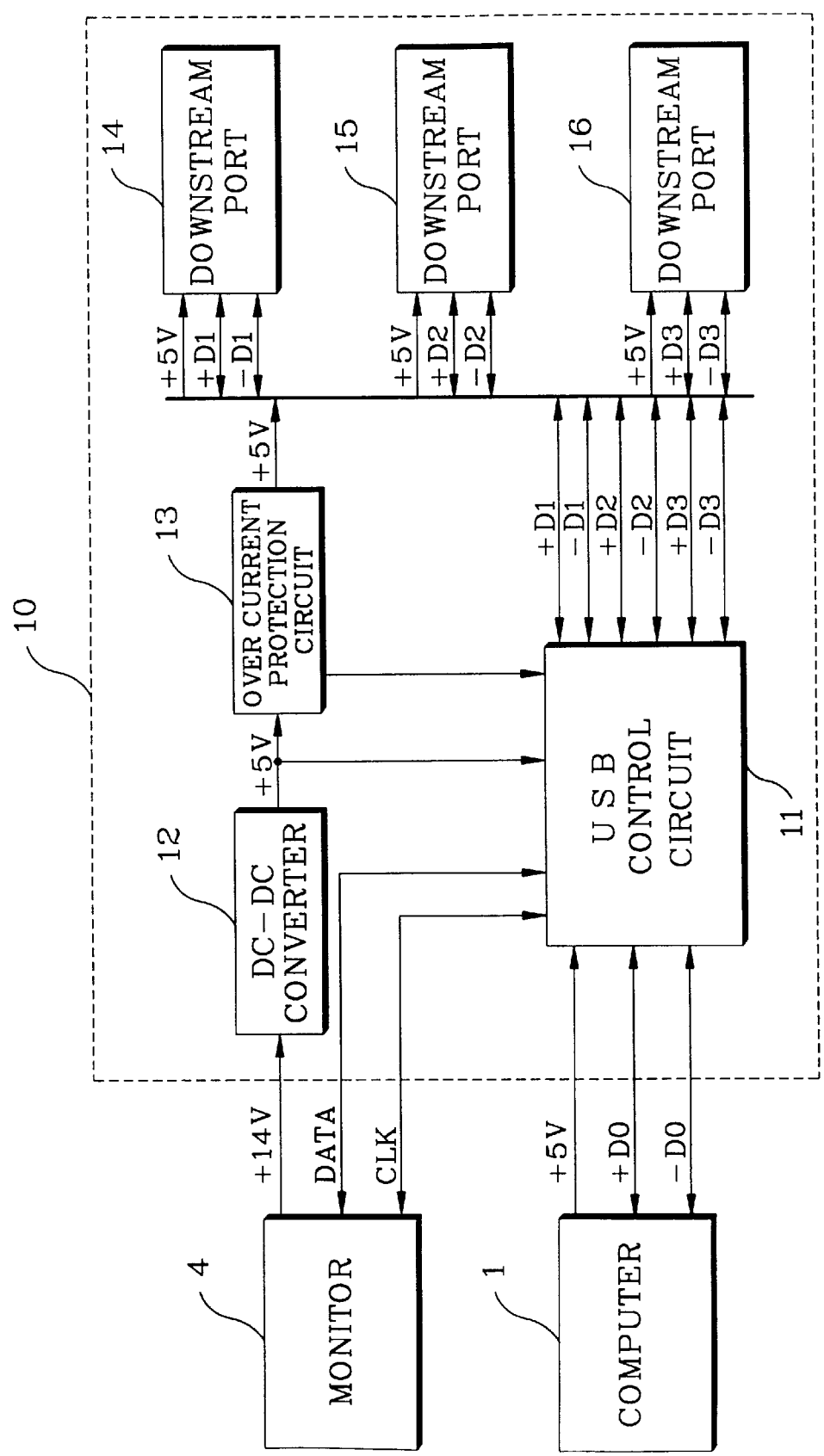
FIG. 3 is a block diagram illustrating the universal serial bus shown in FIG. 2.

Refer now to FIG. 3, which is a block diagram illustrating the universal serial bus shown in FIG. 2. Universal serial bus 10 includes a universal serial bus control circuit 11 for controlling mutual information transmitted between computer 1 and its peripheral devices using data and clocking signals transmitted from monitor 4, a DC—DC converter 12 for processing the power supplied from monitor 4 and thus providing an operation power to down stream ports 14, 15 and 16 connected to universal serial bus control circuit 11 and peripheral devices 5, 6, and 7, and an overcurrent protection circuit 13 for detecting the output current of DC—DC converter 12 in order to avoid damage caused due to overcurrent.

For the operational power of 5 volts for the universal serial bus control circuit 11, the monitor power of 14 V is supplied and DC—DC converter 12 is used. Here, monitor 4 and universal serial bus control circuit 11 are constructed to exchange their data and clocking signals. The power which is stepped down from 14 volts to 5 volts through the DC—DC converter 12 is supplied to universal serial bus control circuit 11 and peripheral devices 5, 6 and 7 via downstream ports 14, 15, and 16. The computer is connected to the upstream port of universal serial bus 10. The universal serial bus is supported by the computer 1.

When computer peripheral devices 5, 6, and 7 are connected to downstream ports 14, 15 and 16 of universal serial bus 10, computer 1 confirms the registered ID, and if there are no problems, the installation is automatically performed. This allows the user to utilize the peripheral devices without needing to perform any tasks other than plugging in the peripheral devices.

If the 14 volt power from the display is not supplied to the universal serial bus 10, the universal serial bus control circuit 11 does not operate, and thus all the advantages associated with the universal serial bus will be unavailable. When the universal serial bus control circuit does not operate, the self-diagnosis function is difficult to perform. Above all, the mutual information is not transmitted between the computer and its peripheral devices, making the user uneasy. Further, the source of the problem will not be immediately known to the user. The user may believe that the problem is due to a failure of the DC—DC converter, or the power source of the universal serial bus 10, or the peripheral devices, because it is difficult for the user to inspect and verify problems in power a supply.

Figure 4:
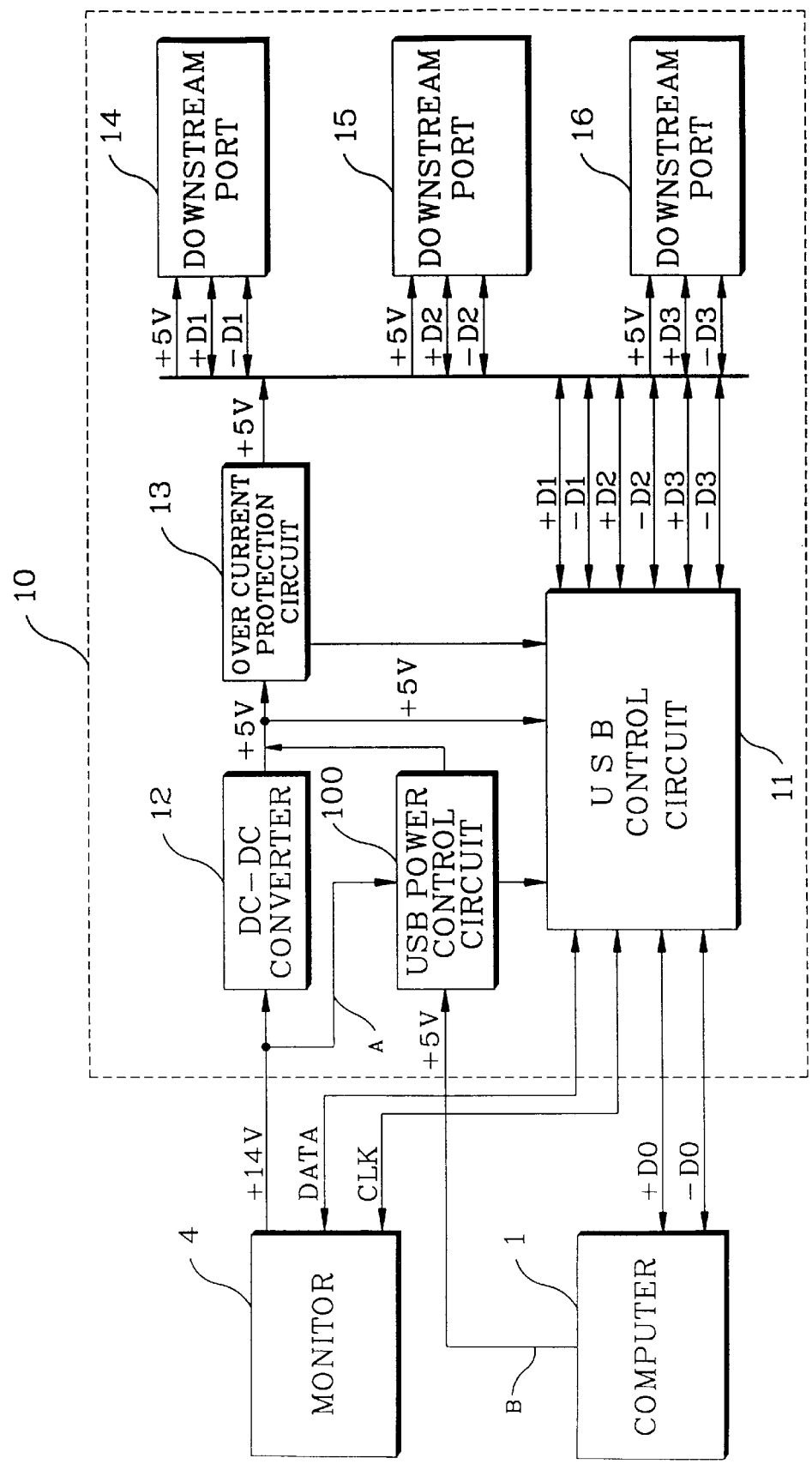
FIG. 4 is a block diagram illustrating a universal serial bus, according to the principles of the present invention.

Refer now to FIG. 4, which is a block diagram illustrating a universal serial bus, according to the principles of the present invention. FIGS. 3 and 4 illustrate some of the same components, which are indicated by the same reference numerals.

In FIG. 4, the universal serial bus 10 of the present invention includes a universal serial bus power control circuit 100 which detects the power supplied to DC—DC converter 12 from monitor 4. If there is any problem with the voltage supplied from monitor 4, the universal power control circuit 100 allows the power supplied from computer 1 to be sent to universal serial bus control circuit 11.

The universal serial bus power control circuit 100 has a power supply line A from monitor 4 and a power supply line B from computer 1. The output result is provided to universal serial bus control circuit 11, and to respective downstream ports 14, 15, and 16 for transmission to the peripheral devices via overcurrent protection circuit 13.

Figure 5:
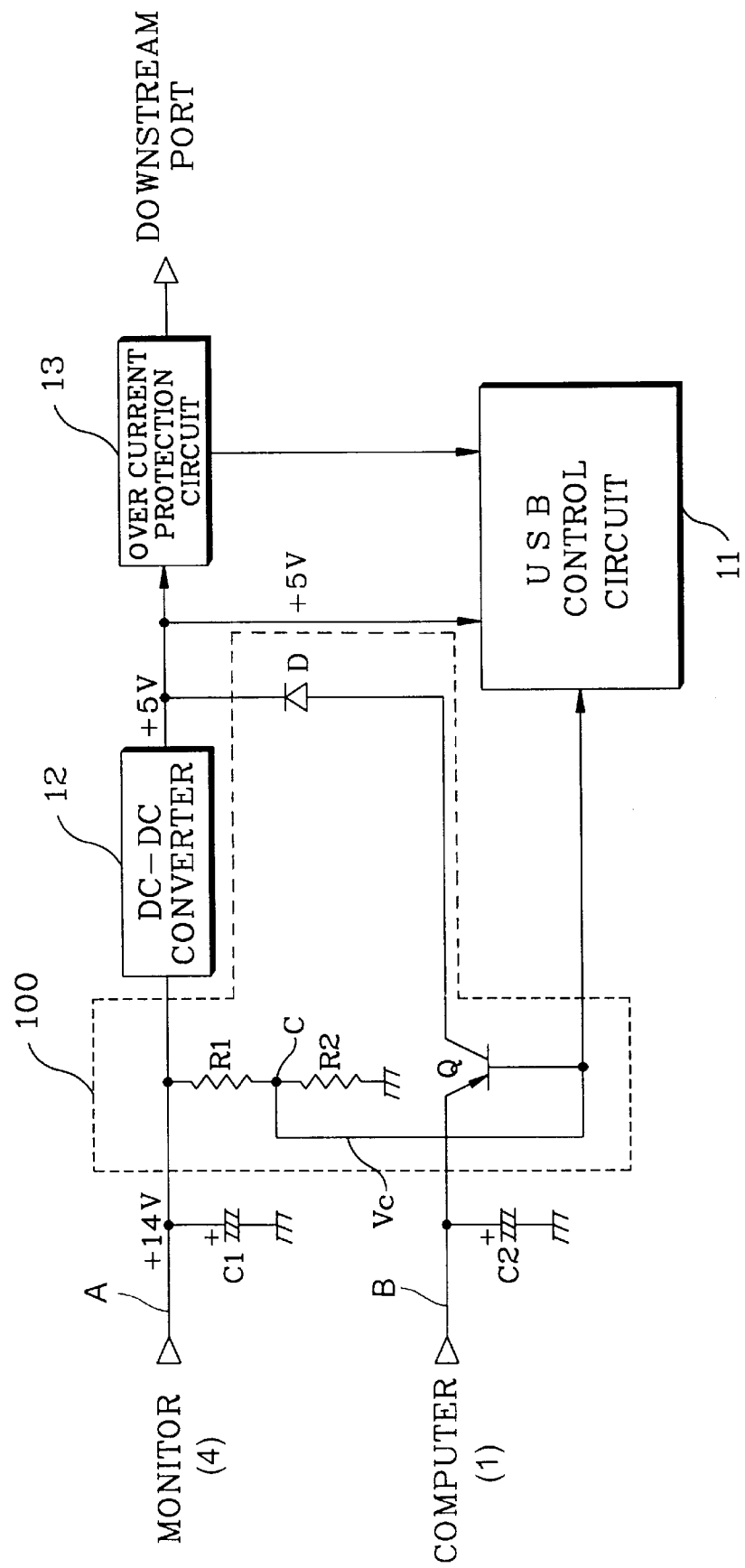
FIG. 5 is a circuit diagram illustrating the universal serial bus shown in FIG. 4, according to the principles of the present invention.

Refer now to FIG. 5, which is a circuit diagram illustrating the universal serial bus shown in FIG. 4, according to the principles of the present invention. In FIG. 5, the universal serial bus control circuit 100 is shown as having resistors R1 and R2, a transistor Q, and a diode D. Detection resistors R1 and R2 are connected to power supply line A supplying 14 volt power to DC—DC converter 12 from monitor 4. The voltage $V_C$ divided by the two resistors is applied to the base of transistor Q. Power supply line B supplies 5 volt power to the emitter of transistor Q from computer 1. Diode D is connected between the collector of transistor Q and the output port of DC—DC converter 12. A signal transmitted to the universal serial bus control circuit 11 via the base of the transistor Q indicates the current status of the power supplied on power supply line A from the monitor 4.

The voltage supplied to the base of transistor Q from the monitor 4 is detected by resistors R1 and R2. The voltage $V_C$ of the node C between the two resistors is determined by the magnitude of the two resistors. The voltage $V_A$ is the voltage of the power supply line A from the monitor 4. The equation for the voltage $V_C$ is as follows:

$$V_C = \frac{R2}{(R1 + R2)} \times V_A$$

Thus, the voltage $V_C$ applied to the base of transistor Q can be controlled by controlling the values of resistors R1 and R2.

The transistor Q is turned on or off according to the magnitude of the voltage of the power supplied to the emitter of transistor Q from the computer 1 and the magnitude of the voltage of the power supplied to the base of transistor Q from the monitor 4.

If the voltage supplied from the monitor 4 is normal, then the voltage Vc divided and detected by resistors R1 and R2 appears to be 5 volts, and is supplied to the base. The voltage of 5 volts applied to the emitter from computer 1 is equal to that applied to the base, and thus the transistor Q is turned off. The signal transmitted to universal serial bus control circuit 11 via the base indicates the current status of the power supplied from the monitor. Thus, the universal serial bus control circuit 11 receives a signal via the base of transistor Q indicating that the status of the power supplied from the monitor 4 is normal. Through this procedure, the voltage supplied from the monitor 4 is supplied to overcurrent protection circuit 13 and universal serial bus control circuit 11 via DC—DC converter 12.

If the voltage supplied from the monitor 4 is not normal, the operation is as follows. The voltage Vc divided and detected by resistors R1 and R2 becomes below 5 volts. A voltage difference ($V_{BC}$>0.7) is produced between the base and emitter of transistor Q. Thus, the transistor Q is turned on. As a result, the power provided from computer 1 is rectified via the collector of transistor Q and diode D, and then sent to overcurrent protection circuit 13 and universal serial bus control circuit 11. The signal transmitted to universal serial bus control circuit 11 via the base indicates the current status of the power supplied from the monitor. Thus, the universal serial bus control circuit 11 receives a signal via the base of transistor Q indicating that the status of the power supplied from the monitor 4 is not normal. The universal serial bus control circuit 11 detects that the status of the power supplied from the monitor 4 is not normal and then transmits the status to computer 1. Thereafter, computer 1 displays the status on the monitor 4, informing the user of the situation.

Figure 6:
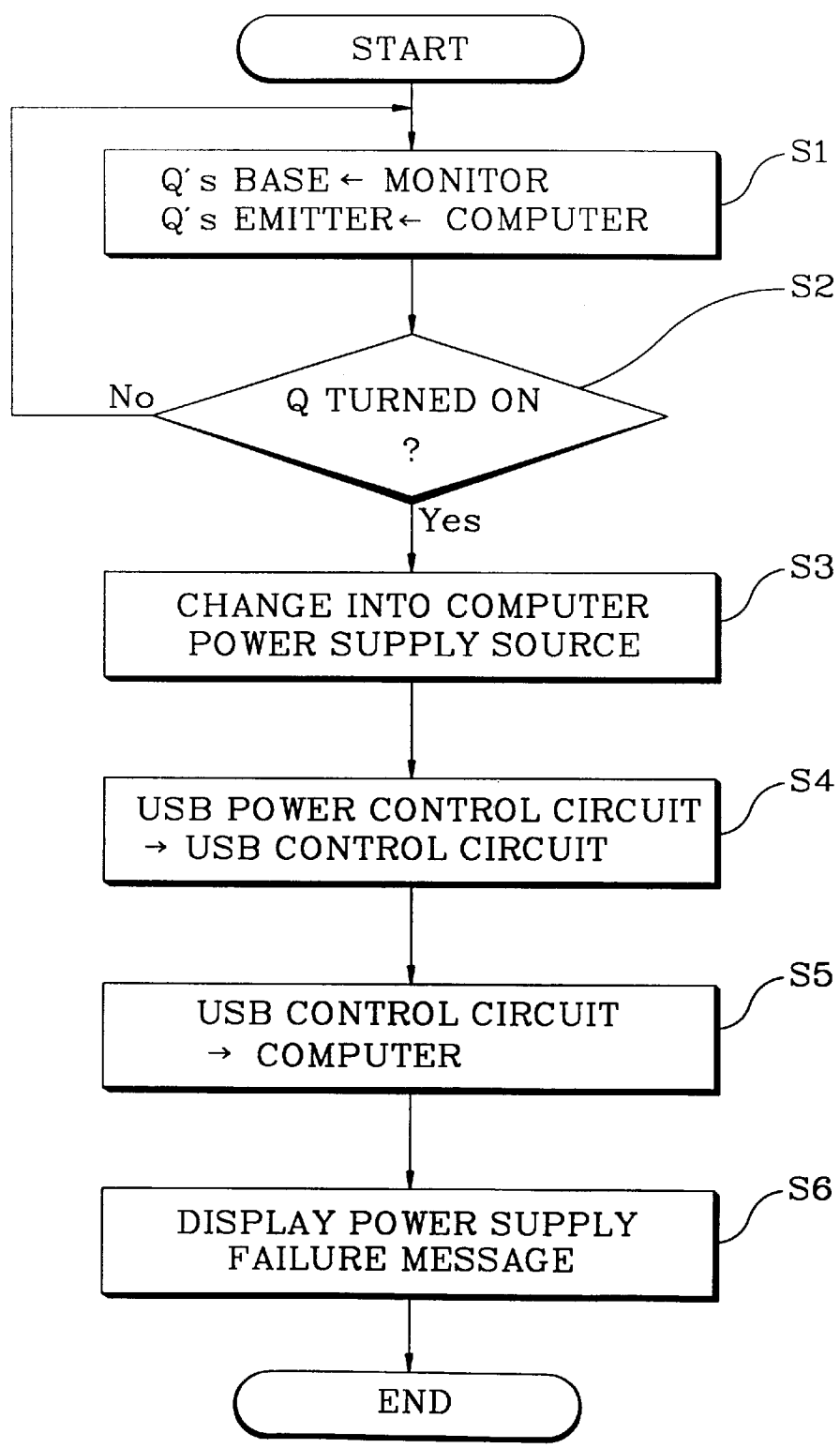
FIG. 6 is a flow chart illustrating a power control method of a universal serial bus, according to the principles of the present invention.

Refer now to FIG. 6, which is a flow chart illustrating a power control method of a universal serial bus, according to the principles of the present invention. In FIG. 6, the operation of controlling the power of universal serial bus 10 is explained with a flowchart. In step S1, the voltage Vc divided from the voltage supplied from the monitor 4, using resistors R1 and R2, is applied to the base of transistor Q. The power from the computer is supplied to the emitter of transistor Q.

In step S2, the status of the transistor Q is detected. Transistor Q can be either on or off. Using the detected status of transistor Q, it is determined whether a power supply from the monitor 4 is normal or not normal. When the transistor Q is off, the power supply from the monitor 4 on power supply line A is considered to be normal.

The transistor Q is turned on when the power supplied from the monitor 4 on power supply line A is considered to be not normal. Step S3 is performed when the transistor Q is turned on, indicating that the power supplied from the monitor 4 is not normal. When the transistor Q is detected to be turned on, the operational power provided from the computer 1 is output via the collector. Thus, in step S3 the power supply source is changed from the monitor 4 to the computer 1. In step S4, a signal is sent from the universal serial bus power control circuit to universal serial bus control circuit indicating that the power supply from the monitor 4 is not normal.

In step S5, the universal serial bus control circuit transmits a signal to the computer 1 indicating that the power supply from the monitor 4 is not normal. In step S6, a power supply failure message is displayed on the monitor in order to inform the user. The message can be shown using an on-screen display. The information is contained in a memory of the computer system, and the microcomputer transmits it to the on-screen display.

As described above, the present invention is capable of detecting the fact that the power supply to the universal serial bus from the monitor is not normal, and is capable of replacing the power source that is not normal with a power source that is normal. Thus, the monitor supplying abnormal power is replaced by the computer supplying normal power. When the power supplied from the monitor is not normal, a power supply failure message is transmitted from the universal serial bus to the computer. Then the power supply failure message is displayed on the monitor. Thus, the user can stay informed of the status of the power to the universal serial bus.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A universal serial bus power control apparatus, comprising:
   a control circuit controlling a transmission of data in a universal serial bus hub;
   a converter unit receiving a first input power from a video display, and outputting a first output power corresponding to the first input power to at least one output port; and
   a power controller detecting the first input power received by said converter unit from the video display, said power controller receiving a second input power from a processing unit;
   when said power controller detects that the first input power is abnormal, said power controller outputting a second output power corresponding to the second input power to the at least one output port.

2. The power control apparatus of claim 1, wherein said control circuit controls the transmission of data between the video display and the at least one output port.

3. The power control apparatus of claim 1, wherein said power controller comprises a transistor having a control electrode receiving the first input power from the video display, a first electrode of a principal electrically conducting channel receiving the second input power from the processing unit, and a second electrode of the principal electrically conducting channel coupled electrically to the at least one output port.

4. The power control apparatus of claim 3, wherein said power controller further comprises a diode rectifying the second input power, said diode having an anode connected to said transistor and a cathode coupled electrically to the at least one output port.

5. The power control apparatus of claim 1, wherein said control circuit outputs a control signal when the first input power is abnormal, and the video display displays a message in response to the control signal informing the user that the first input power received from the video display is abnormal.

6. A universal serial bus power control apparatus, comprising:

a video display conveying varying visual information to a user, and supplying a first power;

a processing unit connected to said video display, processing data signals and the visual information, and supplying a second power;

a plurality of peripheral units connected to said video display and said processing unit, providing supplementary functions to said processing unit, receiving the data signals, and selectively receiving one of the first and second powers; and a control unit receiving the data signals, controlling a transmission of the data signals to said processing unit and said plurality of peripheral units, receiving the first power from said video display and the second power from said processing unit, detecting the first power, and supplying the second power to said plurality of peripheral units according to the first power, the first power being a voltage selected from the group consisting of a plurality of standard voltages and a plurality of nonstandard voltages.

7. The power control apparatus of claim 6, wherein said control unit supplies the second power to said plurality of peripheral units when the first power corresponds to the plurality of nonstandard voltages.

8. The power control apparatus of claim 6, wherein said control unit does not supply the second power to said plurality of peripheral units when the first power corresponds to the plurality of standard voltages.

9. A universal serial bus power control apparatus, comprising:

a converter unit receiving a first power from a video display, the video display conveying varying visual information to a user;

a power controller detecting the first power, wherein the first power is a voltage selected from the group consisting of a plurality of standard voltages and a plurality of nonstandard voltages, said power controller receiving a second power from a processing unit connected to the video display, the processing unit processing data signals and the visual information;

when the voltage of the first power corresponds to the plurality of standard voltages, said converter unit transmits the first power to at least one output port;

when the voltage of the first power corresponds to the plurality of nonstandard voltages, said power controller transmits the second power to the at least one output port; and a control circuit controlling data signals transmitted between the processing unit and the at least one output port, said control circuit transmitting a control signal to the video display to inform the user of the nonstandard voltage of the first power when the voltage of the first power corresponds to the plurality of nonstandard voltages.

10. The power control apparatus of claim 9, wherein said power controller comprises:

a divider converting the first power to an intermediate power;

a detector detecting the intermediate power; and a rectifier rectifying the second power according to the intermediate power.

11. The power control apparatus of claim 10, wherein said divider comprises a plurality of resistors converting the first power to the intermediate power.

12. The power control apparatus of claim 10, wherein said detector comprises a transistor having a control electrode receiving the intermediate power from said divider, a first electrode of a principal electrically conducting channel receiving the second power from the processing unit, and a second electrode of the principal electrically conducting channel connected to said rectifier.

13. The power control apparatus of claim 10, wherein said rectifier comprises a diode having an anode connected to said detector and a cathode coupled electrically to the at least one output port.

14. The power control apparatus of claim 9, wherein said converter unit steps down the voltage of the first power received from the video display, and then outputs the stepped down first power to the at least one output port.

15. A universal serial bus power control apparatus, comprising:

a video display conveying varying visual information to a user, transmitting data signals and clock signals, and supplying a first power;

a processing unit connected to said video display, processing the data signals and the visual information, and supplying a second power;

a plurality of peripheral units connected to said video display and said processing unit, providing supplementary functions to said processing unit, and receiving the data signals;

a first control unit receiving the data and clock signals from said video display, and controlling a transmission of the data signals to said processing unit and said plurality of peripheral units according to the clock signals;

a second control unit receiving the first power from said video display and the second power from said processing unit, converting the first power to a third power, detecting the third power, and supplying the second power to said first control unit and said plurality of peripheral units according to the third power; and a power unit receiving the first power from said video display, converting the first power to a fourth power, and transmitting the fourth power to said first control unit and plurality of peripheral units, the third power being a voltage selected from the group consisting of a plurality of standard voltages and a plurality of nonstandard voltages.

16. The power control apparatus of claim 15, wherein said second control unit rectifies the second power when the third power corresponds to the plurality of nonstandard voltages, and said second control unit supplies the second power to said first control unit and said plurality of peripheral units when the third power corresponds to the plurality of nonstandard voltages.

17. The power control apparatus of claim 15, wherein said second control unit does not rectify the second power when the third power corresponds to the plurality of standard voltages, said second control unit does not supply the second power to said first control unit when the third power corresponds to the plurality of standard voltages, and said second control unit does not supply the second power to said plurality of peripheral units when the third power corresponds to the plurality of standard voltages.

18. A method of controlling power in a universal serial bus power control apparatus, comprising the steps of:

receiving a first power from a video display, said video display conveying varying visual information to a user;

detecting the first power, wherein the first power is a voltage selected from the group consisting of a plurality of standard voltages and a plurality of nonstandard voltages;

receiving a second power from a processing unit connected to said video display, said processing unit processing data signals and the visual information;

when the voltage of the first power corresponds to the plurality of standard voltages, transmitting the first power from a control unit to a plurality of peripheral units, said plurality of peripheral units providing supplementary functions to said processing unit and connected to said video display and said processing unit;

when the voltage of the first power corresponds to the plurality of nonstandard voltages, transmitting the second power from said control unit to the plurality of peripheral units; and transmitting a control signal from said control unit to said video display informing the user of the voltage of the first power.

19. The method of claim 18, wherein said control unit comprises a controller detecting the voltage of the first power, and then transmitting to said plurality of peripheral units a primary power selected from among the first and second powers.

20. The method of claim 18, wherein said control unit comprises a transistor having a control electrode receiving the first power from said video display, a first electrode of a principal electrically conducting channel receiving the second power from said processing unit, and a second electrode of the principal electrically conducting channel connected to said plurality of peripheral units.

* * * * *